United States Patent [19]

Beavers et al.

[11] 3,986,687

[45] Oct. 19, 1976

[54] AIRCRAFT PROPULSION SYSTEM WITH FLIGHT MANEUVERABLE EXHAUST NOZZLE

[75] Inventors: Robert G. Beavers, Mason; Kermit F. Byrd, Westchester, both of Ohio

[73] Assignee: General Electric Company, Cincinnati, Ohio

[22] Filed: June 30, 1975

[21] Appl. No.: 591,879

[52] U.S. Cl. ............................ 244/12 D; 60/261; 239/265.41; 244/52
[51] Int. Cl.² ...................................... B64C 15/06
[58] Field of Search ................ 244/12 D, 12 R, 15, 244/42 CC, 52, 53 R, 23 D, 55; 60/261, 39.72 R; 239/265.39, 265.41

[56] References Cited
UNITED STATES PATENTS

| | | | |
|---|---|---|---|
| 2,420,323 | 5/1947 | Meyer et al. | 244/12 D |
| 2,479,487 | 8/1949 | Goembel | 244/15 |
| 2,756,008 | 7/1956 | Davidson | 244/15 |
| 3,148,848 | 9/1964 | Price | 244/52 |
| 3,188,803 | 6/1965 | Maguire | 239/265.39 |
| 3,658,279 | 4/1972 | Robertson | 244/42 CC X |

FOREIGN PATENTS OR APPLICATIONS

| | | | |
|---|---|---|---|
| 889,540 | 2/1962 | United Kingdom | 244/15 |

*Primary Examiner*—Trygve M. Blix
*Assistant Examiner*—Barry L. Kelmachter
*Attorney, Agent, or Firm*—Robert C. Lampe, Jr.; Derek P. Lawrence

[57] ABSTRACT

An aircraft propulsion system is provided which incorporates a flight maneuverable exhaust nozzle. In one embodiment, gas turbine engines are mounted on both sides of an aircraft fuselage, each engine having an exhaust duct partially defining an exhaust stream flow path. The duct transits from a substantially cylindrical diffuser section aft of the engine to a relatively high aspect ratio section proximate the trailing edge of the wing. Exhaust gases are expelled through a thrust vectorable nozzle which is contoured within the wing and which is adapted to increase wing lift through the concept of supercirculation. Maximum aerodynamic advantage is achieved by distributing the exhaust flow over a significant portion of the wing span at the trailing edge. Thrust augmentation is provided through use of a long, flat duct burner disposed within the high aspect ratio section proximate the exhaust nozzle thereby minimizing turning losses and cooling air requirements. The exhaust nozzle includes an articulated deflector partially defining both the exhaust stream flow path and the wing upper surface. Synchronous movement of the two flaps comprising the deflector ensures proper internal area control prior to exhaust gas vectoring. The nozzle throat area is varied by a lower flap disposed in general opposition to the articulated deflector. Actuators are provided to vary the throat area and produce the proper thrust vector angle by positioning the lower flap and articulated deflector, respectively.

21 Claims, 10 Drawing Figures

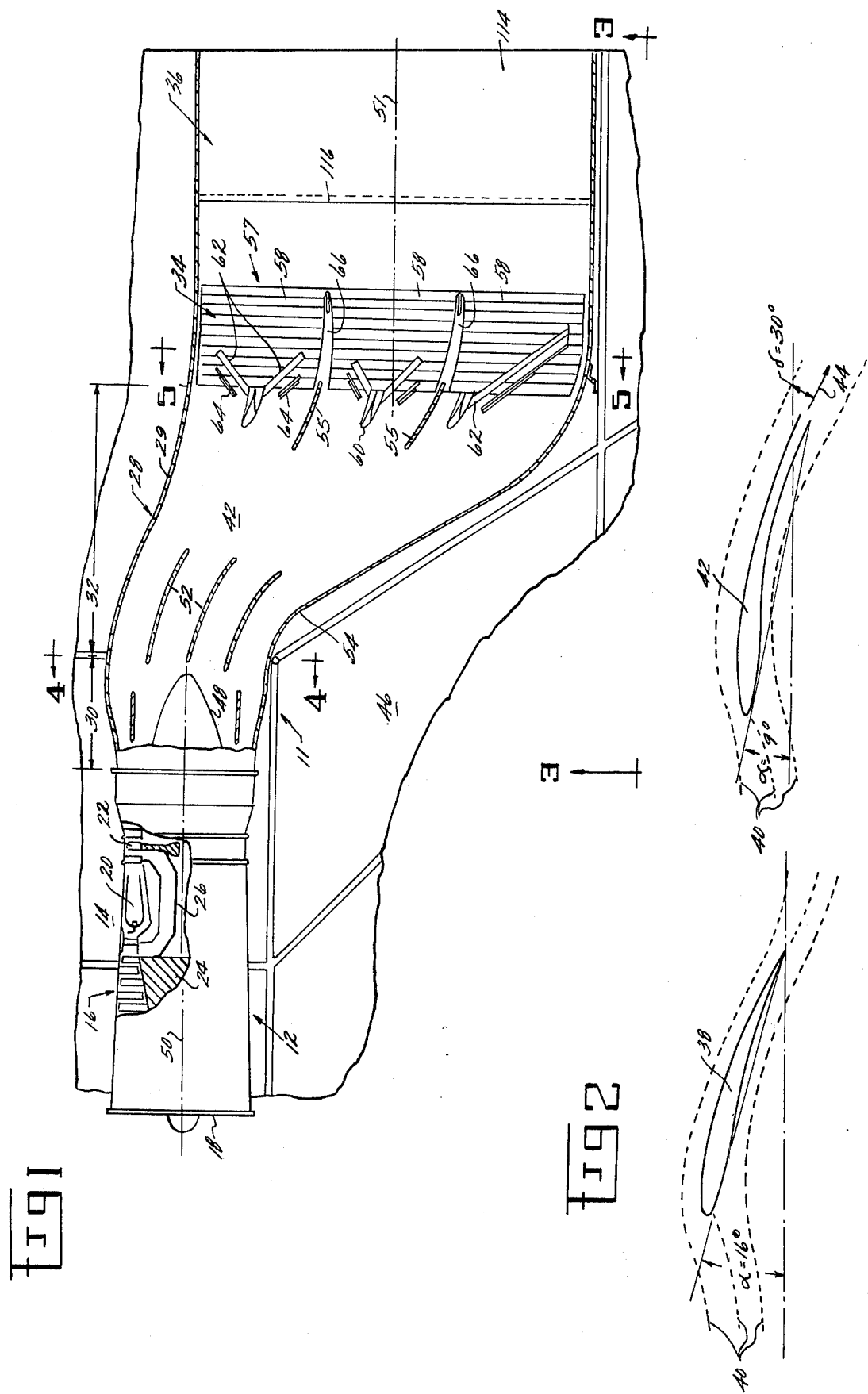

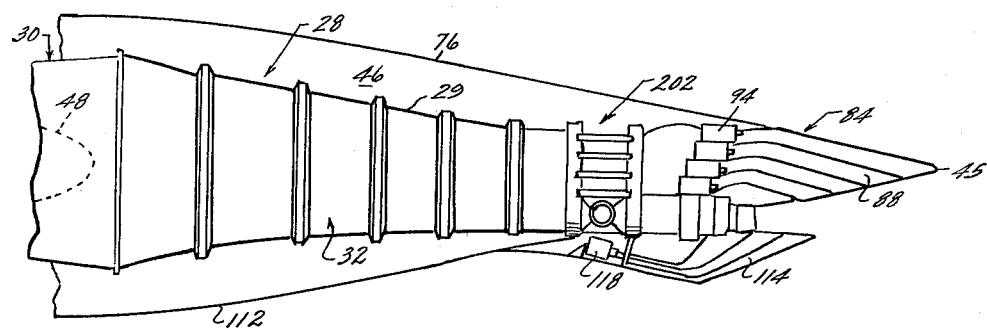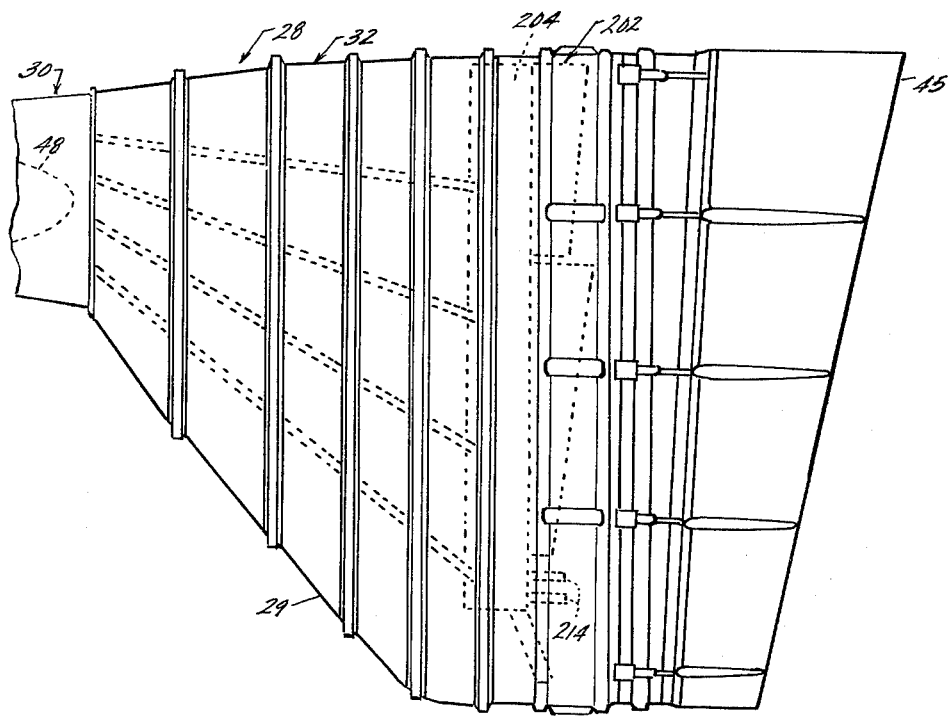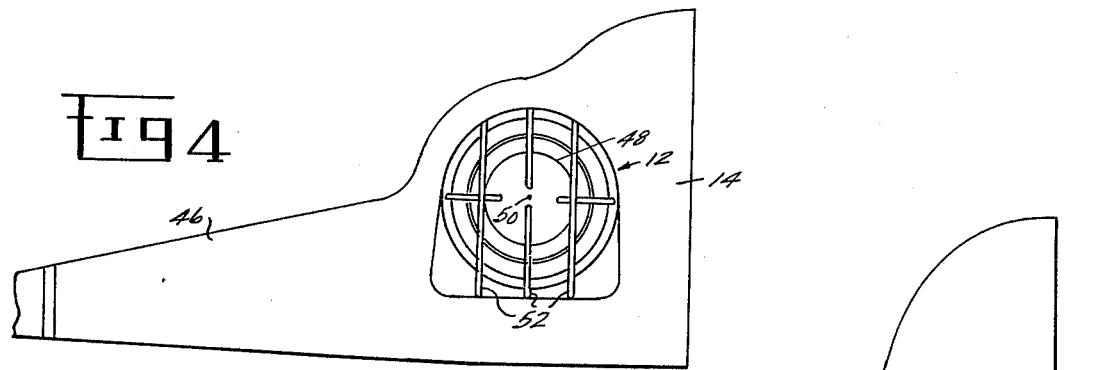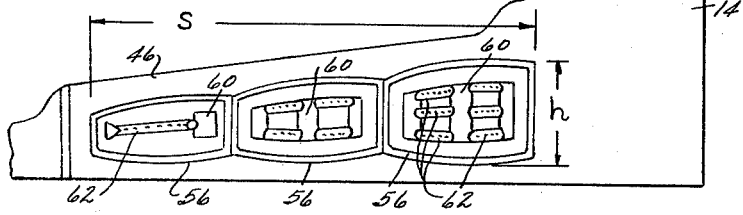

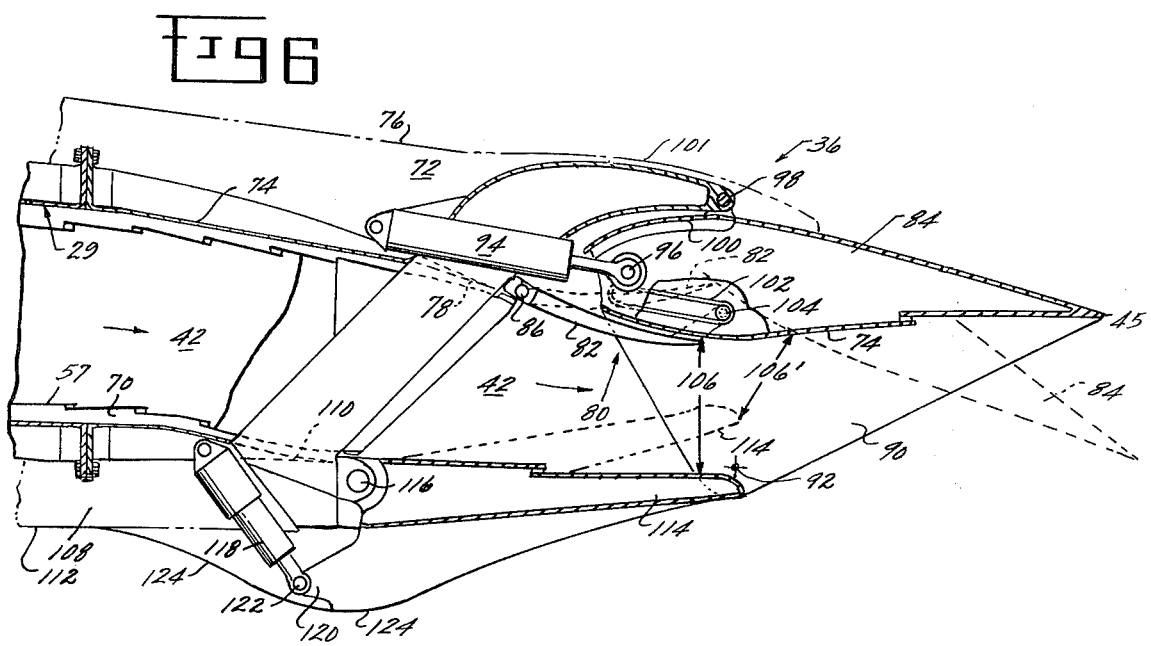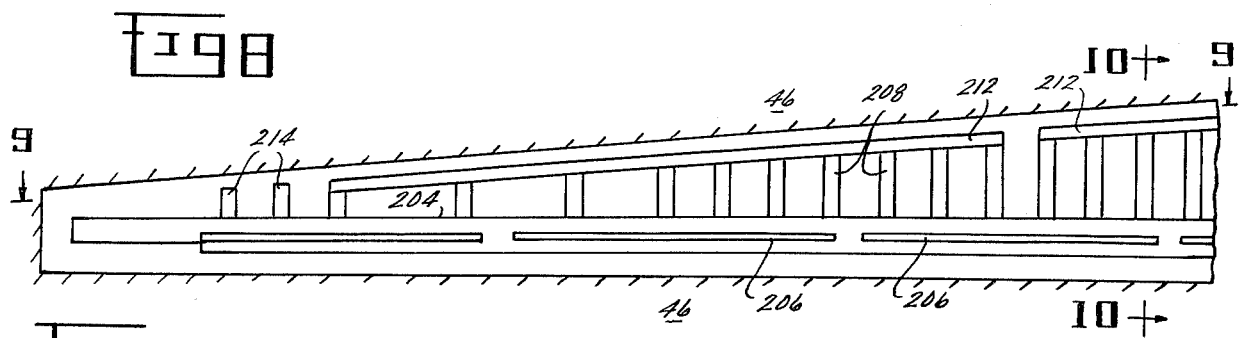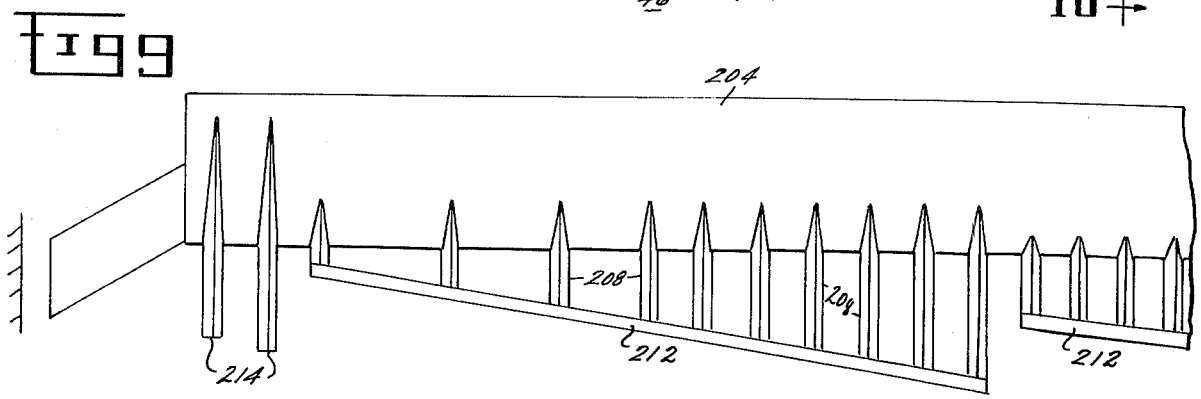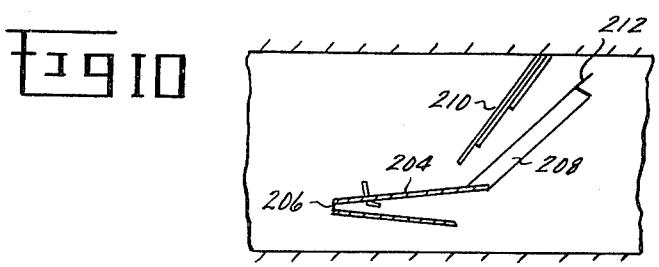

AIRCRAFT PROPULSION SYSTEM WITH FLIGHT MANEUVERABLE EXHAUST NOZZLE

The invention herein described was made in the course of or under a contract or subcontract thereunder (or grant) with the Department of the Navy.

BACKGROUND OF THE INVENTION

This invention relates to gas turbine engine propulsion systems and, more particularly, propulsion systems of the flight maneuverable variety.

The high velocity imparted to exhaust gases of a gas turbine engine by the exhaust nozzle provides thrust for propulsion. This thrust is substantially opposite to the direction of the flow of exhaust gases exiting the nozzle. Consequently, if the direction of the exhaust gases is changed, the direction of propulsive thrust is correspondingly varied. Typically, aircraft gas turbine engines are provided with nozzles which are fixed in the axial direction, and aircraft maneuvering is accomplished solely by airframe control surfaces. Advanced aircraft configurations contemplate, and may even require, the selective redirection (or vectoring) of gas turbine engine thrust in order to enhance aircraft performance and to provide the aircraft with operational characteristics heretofore deemed impractical. For example, if the exhaust of a conventionally installed gas turbine engine is directed downwardly, rather than rearwardly, to a direction substantially perpendicular to the engine longitudinal axis, the resulting upward thrust would provide direct lift for the aircraft and, if properly controlled, a vertical take-off and landing capability. Similarly, thrust vectoring during flight can greatly increase aircraft maneuverability since the thrust force can augment the maneuvering forces of the aircraft control surfaces such as elevators, ailerons, and rudders. In order to accomplish such thrust vectoring, a device is required to efficiently and practically alter the direction of gas turbine engine exhaust nozzle gases.

Thrust vectoring may be employed in essentially two types of applications. First, it may be used in vertical take-off and landing (VTOL) applications where aircraft operation is at low speed and where continuous vector angle capability up to essentially 90° is required for generating aircraft lift. Secondly, thrust vectoring is employed at relatively high aircraft speeds to achieve combat maneuver capability, the range of vectoring being limited to approximately 30° or 40°. The fundamental difference between these two concepts is that the VTOL application generates system-lift by simply deflecting the engine flow, whereas an in-flight vectoring application utilizing the principal of supercirculation provides lift augmentation that is several times greater than the vertical thrust component of the VTOL application. As is well known in the art, supercirculation refers to the additional wing lift generation due to directing airflow out of, or over, a wing in such a manner as to effectively change the aerodynamic shape of the wing. This lowers the required angle of attack at high subsonic maneuver conditions, thus enabling the aircraft to make high G turns with less drag.

It is predicted that drag reductions in excess of 40% are attainable at typical combat conditions when an aircraft incorporates a flight maneuverable propulsion system for lift augmentation wherein the engine exhaust flow is expelled through the wing in such a manner as to provide the additional lift through supercirculation. This drag reduction allows the engine to be sized significantly smaller than otherwise possible.

However, requirements which have heretofore been associated with the development of such a system have been that:

exhaust system turning losses must be minimized;

most combat aircraft require afterburning (or augmentation) and the burner must be optimized to provide the necessary combustion efficiency in a limited axial length;

the gas turbine engine exhaust stream must be matched to the wing trailing edge to minimize installation drag over the entire flight envelope;

since the afterburner is installed within the wing, cooling must be provided to maintain structural integrity; and actuators should be kept simple, and their number to a minimum.

The problem facing the gas turbine engine and aircraft designers, therefore, is to provide a flight maneuverable propulsion system which can efficiently and effectively incorporate the aforementioned advantages while meeting these key requirements.

SUMMARY OF THE INVENTION

Accordingly, it is a primary object of the present invention to provide a flight maneuverable propulsion system of reduced complexity which is aerodynamically contoured for disposition within an aircraft wing.

It is another object of the present invention to provide a propulsion system which cooperates with a wing to increase lift through supercirculation.

It is a further object of the present invention to provide an exhaust nozzle which will provide highly efficient in-flight thrust vectoring to improve aircraft maneuverability.

These and other objects and advantages will be more clearly understood from the following detailed description, drawings and specific examples, all of which are intended to be typical of rather than in any way limiting to the scope of the present invention.

Briefly stated, in one embodiment the above objectives are accomplished in a twin-engine aircraft by mounting gas turbine engines within both sides of the aircraft fuselage. In each engine a transition duct directs the exhaust gas from that engine outwardly into the wing wherein it is reheated in a high aspect ratio duct burner assembly contoured to the wing profile. Maximum aerodynamic advantage of the exhaust gas is achieved by ejecting it through a flight maneuverable exhaust nozzle formed over a significant portion of the wing span at the trailing edge.

The exhaust nozzle includes an articulated deflector partially defining both the exhaust stream flow path and the wing upper surface. Synchronous movement of two flaps comprising the deflector ensures proper internal area control prior to exhaust gas vectoring. The nozzle throat is varied by a lower flap disposed in general opposition to the articulated deflector, the lower flap further defining the exhaust stream flow path and comprising a portion of the wing lower surface. Actuation means are provided to vary the throat area and produce the proper thrust vector angle by positioning the lower flap and articulated deflector, respectively.

DESCRIPTION OF THE DRAWINGS

While the specification concludes with claims particularly pointing out and distinctly claiming the subject matter which is regarded as part of the present invention, it is believed that the invention will be more fully understood from the following description of the preferred embodiments which is given by way of example with the accompanying drawings, in which:

FIG. 1 is a plan view, schematically depicting a representative installation, of the propulsion system of the present invention in an aircraft;

FIG. 2 demonstrates the effect of supercirculation upon the performance of an aircraft wing;

FIG. 3 is a side view of the propulsion system of the present invention taken along line 3—3 of FIG. 1;

FIG. 4 is a cross-sectional view of the propulsion system of the present invention taken along line 4—4 of FIG. 1;

FIG. 5 is a cross-sectional view, similar to FIG. 4, and taken along line 5—5 of FIG. 1;

FIG. 6 is an enlarged cut-away schematic representation of the flight maneuverable exhaust nozzle portion of the propulsion system of FIG. 1;

FIG. 7 is a plan view schematically depicting a portion of the propulsion system of FIG. 1 and incorporating an alternative afterburner embodiment;

FIG. 8 is an enlarged end view of the afterburner of FIG. 7;

FIG. 9 is a cross-sectional view of the afterburner of FIG. 8 taken along line 9—9; and FIG. 10 is a cross-sectional view of the afterburner of FIG. 8 taken along line 10—10.

DESCRIPTION OF THE PREFERRED EMBODIMENT

Referring to the drawings wherein like numerals correspond to like elements throughout, attention is first directed to FIG. 1 wherein a propulsion system, depicted generally at 11, and constructed in accordance with the present invention is diagrammatically shown. While not so limiting, the propulsion system is meant to be representative of a twin-engine installation wherein two gas turbine engines 12 are mounted symmetrically within an aircraft fuselage 14. Because of the symmetry of the system, only one engine 12 is shown, that being the left-hand engine when the aircraft is viewed in plan form from the top with the front of the engine being to the left in FIG. 1. It is recognized that a similar propulsion system, in mirror image, would appear on the right side of the aircraft.

Briefly stated, the engine 12 comprises an axial flow compressor 16 which pressurizes air entering inlet 18 to support combustion of fuel in combustor 20. The hot gas stream generated by combustor 20 is expanded through and drive turbine 22 which, in turn, is drivingly connected to the rotor portion 24 of compressor 16 by shaft 26 in the usual manner of a gas turbine engine. After the gases are expanded through turbine 22, they enter an exhaust system depicted generally at 28 and which comprises a casing 29 defining, in serial flow relationship, a diffuser 30, a transition duct 32, an afterburner 34 and a flight-maneuverable exhaust device 36. As used hereinafter, the term "exhaust device" is meant to include a core engine exhaust nozzle, or any other gas turbine engine exhaust nozzle whether or not it is preceded in serial flow relationship by a combustor.

Referring now to FIG. 2, the concept of supercirculation is demonstrated. FIG. 2A depicts a conventional aircraft wing 38 disposed in a flow field represented by streamlines 40 and at an angle of attack ($\alpha$) of 16°. FIG. 2B depicts an aircraft wing 42 having the same lift coefficient as wing 38 and incorporating the jet flap principal wherein a high velocity gas stream 44 is ejected out of the trailing edge of the wing, in this example at an angle $\delta$ of 30° with the free stream. Due to the effect of supercirculation inducing additional circulation and lift through an effective change in the aerodynamic shape of the wing at the trailing edge, the same lift coefficient may be obtained at a much lower angle of attack ($\alpha = 9.0°$). For one representative airfoil section chosen for a purpose of example, the reduction of angle of attack yielded a 41 percent drag reduction. Thus, in fighter aircraft applications, the concept of supercirculation allows the designer to lower the required angle of attack at high subsonic maneuvering conditions, enabling the aircraft to make high performance turns with less drag. The jet flap structure to be described hereinafter incorporates the principal of supercirculation and provides a highly efficient in-flight thrust vectoring capability to improve aircraft maneuverability.

Referring now to FIGS. 1 and 3 through 5 wherein the subject invention is depicted in greater detail, it may be seen that casing 29 defines an exhaust stream flow path 42 extending from engine 12 to the trailing edge 45 of a wing 46. The forward end of casing 29 and the aft end of engine 12, comprising centerbody 48, are of circular cross section and concentric about longitudinal axis 50 of engine 12. (As used hereinafter, the term "circular" is meant to include such related shapes as eliptical and oval.) Thus, the exhaust passage 42 at the forward end of the exhaust system is substantially annular and concentric about axis 50 as clearly shown in FIG. 4 which represents a cross-sectional view taken along line 4—4 of FIG. 1.

It has been discovered that in order to avoid large turning losses as the exhaust flow is directed outwardly into an aircraft wing, it is desirable to diffuse the flow to a relatively low Mach number prior to turning. This also allows for more effective afterburning in the short burning lengths available. Accordingly, the forward end of casing 29 defines a diffusing section or diffuser 30. As depicted, diffusion occurs as a result of cooperation of progressively decreasing centerbody 48 cross-sectional area with moderately increasing casing out diameter. It is to be understood that in certain applications, it may be possible to provide diffusion solely through an increase in casing diameter or a decrease in centerbody diameter, and the configuration depicted is merely illustrative of one such arrangement.

The transition duct 32 is located downstream of the diffuser 30 and maintains substantially constant flow area while transitioning from the circular cross section of the diffuser to a substantially rectangular or trapezoidal cross section while contemporaneously directing the flow from the engine longitudinal axis 50, through an S-shaped turn, to the afterburner 34 having an axial centerline 51 laterally displaced from the core engine axis. To assist in the flow turning, which in some cases may be severe due to the short duct length available, a plurality of turning vanes 52 are provided which extend across duct 29 essentially normal to the direction of turning. This prevents flow separation from the duct outer wall 54 and flow maldistribution within flow path 42. Thus, the flow is able to negotiate the high-angle turns and enter the afterburner section with minimum flow profile distortion. While turning vanes 52 are shown to extend only partially through the diffuser, it may be necessary to employ multiple full-length turning vanes extending substantially the entire length of the transition duct section to provide undistorted flow to the afterburner section. Addition of the turning vanes contributes no weight penalty as they are efficiently used as tension members in the structure, and they create only an extremely small amount of skin friction drag which is more than offset by the increase in system performance.

In general, the exhaust system's integration within an aircraft fuselage/wing arrangement improves as the exhaust jet span-to-height ratio (s/h) increases (FIG. 5), since a long, flat duct minimizes the bulge required in the wing to house the exhaust system. (As used herein, the ratio $s/h$ is defined as "aspect ratio".) However, exhaust system weight, internal flow losses and cooling difficulty also tend to increase with aspect ratio. These conflicting trends suggest that an optimum aspect ratio exists which can only be determined from the design considerations of the complete aircraft system. In some applications, aspect ratios as high as 30 would not be unrealistic, whereas the aspect ratio of FIG. 5 is more in the order of 5.

The addition of afterburning to the exhaust system provides increased aircraft performance capability. However, minimum burning length is available in the typical anticipated jet flap system. Thus, a short length afterburner 34 is required. But, shorter lengths generally require more flameholding sources to maintain the overall combustion efficiency and this may increase the pressure loss (a measure of efficiency) across the flameholders. A practical augmenter system is depicted in FIGS. 1 and 5 which will be discussed in greater detail hereinafter. The transition duct 32 provides the flow transition from the circular diffuser to a lobed trapezoidal shape of the afterburner 34. At the aft end of the transition duct are two turning vanes 55 of construction similar to vanes 52 and which similarly serve to react pressure loads in the lobe portion of the duct and turn the exhaust flow back to axial. Note that the trapezoidal section of the duct is lobed with three parabolic panels 56 (FIG. 5) so as to eliminate bending and develop full membrane loads in these panels.

Referring now to FIGS. 1 and 5, the afterburner comprises a liner 57 forming a plurality of segmented burners 58, herein depicted as three in number. Each of these burners requires independent igniters or, alternatively, cross-firing devices, neither of which is shown in FIG. 1. Associated with each burner is a pilot burner 60 and one or more V-shaped flameholders 62 extending therefrom. Fuel injectors 64 are closely coupled to the flameholder array to avoid auto-ignition of the fuel which may occur when too great a distance is permitted. The fuel injectors may be of the typical afterburner variety utilizing simple injection orifices drilled in the injection tubes. Final turning of the exhaust flow is not completed until the end of the flameholder is reached, the partitions 66 between adjacent segments completing the turning, thus utilizing the available length to the maximum and providing a minimum risk, low pressure loss turn.

FIGS. 7 through 10 represent an alternative to the compartmented afterburner of FIG. 1. As depicted in FIG. 7, turning of the exhaust stream is accomplished substantially within the transition duct section 32 prior to entering modified afterburner assembly 202 which is of the nonsegmented, full-span variety.

Directing attention to FIGS. 8 through 10 wherein the afterburner assembly 202 is shown in greater detail it may be appreciated that the structure is adapted to conform to the contour of the wing 46, thereby possessing a generally trapezoidal cross section. A full-span pilot burner 204 of V-shaped cross section and having a plurality of laterally extending slots 206 is disposed in the leading edge thereof. The slots are adapted to receive a combustible mixture of exhaust gas and fuel which is burned within the V-shaped pilot to provide ignition of the remainder of the system. A plurality of vertical, V-shaped flameholders 208 extending from the pilot burner 204 serve to combust the mixture fuel from spraybars 210 and exhaust gases in the normal manner of an afterburner. The flameholders 208 are leaned in the axial direction because, in the non-afterburning mode, the pressure loss across them (a measure of efficiency) is a function of their blockage. Thus, by leaning the flameholder, the blockage may be spread over a greater axial length and the pressure drop minimized. As shown in FIG. 9, some of the flameholders may be leaned at different angles, thus having different axial projections, depending on the anticipated flow conditions.

Cross fire V-gutters 212 ensure uniform flamespreading to the vertical flameholders 208 and provide continuous flamespreading proximate the duct wall. A single cross fire gutter may span all of the flameholders or several of them as depicted in FIGS. 8 and 9. In some circumstances it may be possible to eliminate them entirely, as from flameholders 214.

Such an alternative afterburner design provides simplicity and reliability since uniform flame propagation is virtually assured without reliance on multiple ignition systems or complicated cross-over networks.

Cooling of the afterburner is accomplished by means of a cooling liner 57 disposed within duct 29 and separated therefrom to form a coolant passage 70 therebetween (FIG. 6). Cooling fluid from the compressor 16 or turbine 22 of engine 12 is ducted to the passage 70 through a liner within the transition duct (for example) and cools the liner by the conventional means of convection and film cooling. Disposition of the afterburner in close axial proximity to the exhaust nozzle 36 minimizes cooling requirements since it minimizes the structure downstream of the afterburner which is required to be cooled.

FIG. 6 shows a schematic cross-sectional view of one embodiment of a flight maneuverable exhaust nozzle 36 adapted to utilize the effect of supercirculation in cooperation with the high aspect ratio exhaust duct hereinbefore described. Accordingly, the nozzle is substantially two-dimensional, meaning that its cross-sectional profile is essentially constant across the high aspect ratio span. A first wall 72 having an inner surface 74 comprising a portion of duct 29 partially defines the exhaust stream flow path 42 and further partially defines a portion of the wing upper surface 76. The inner surface 74 converges in the axially rearward direction to form a fixed position internal ramp 78. This ramp, being an integral portion of the fixed casing structure, contributes to high nozzle internal performance for all nozzle area settings.

Continuing rearwardly, it is observed that the inner surface 74 of wall 72 is further defined by an articulated deflector means 80 comprising cooperating first and second flaps 82, 84 respectively. Flap 82 is of the variable position variety pivotably connected to the fixed duct 29 at 86 and free to pivot thereabout except for the operative connecting means to be described.

Flap 84 is a relatively large jet deflector flap, also of the variable position variety, which forms a portion of the wing trailing edge 45. It comprises, in effect, an airfoil section partially defining both flow path 42 and wing surface 76, and a pair of downward extending side plates 90 pivotably connected to the fixed side walls of trapezoidal or rectangular duct 29 at 92. Thus, flap 84 is of substantially inverted U-shaped profile and capable of rotating about its pivot connection 92.

The actuating force necessary for deployment of flaps 84 is obtained by means of an actuator (or plurality of actuators) 94 disposed within wall 72 and operatively connected to flap 84 as at 96. Such actuators may be of any known variety capable of withstanding the environment of the exhaust system and providing the necessary actuation forces. The actuator 94 causes deployment of flap 84 through rotation about pivot 92, the flap being supported at its outer surface by a roller 98 and a track assembly 100. Fairing 101 provides a streamlined housing for this mechanism.

Side plates 90 have formed therein an elongated slot 102 adapted to receive a cam extension 104 of flap 82. This operative connecting means between flap 82 and 84 causes flap 82 to rotate and follow flap 84 in a predetermined relationship as flap 84 is rotated to a deployed position indicated in phantom in FIG. 6. Note that during actuation the directions of rotation of flaps 82 and 84 are opposite about their respective pivot points. In the non-deployed mode, flap 82 forms an extension of fixed ramp 78 to a point of minimum flow path area (throat) 106, the flow path thereafter diverging along inner surface of flap 84 which provides exhaust gas expansion control.

In the deployed position as shown in phantom in FIG. 6, the flap 82 increases the internal flow path area ahead of the deflector flap 84 thereby decreasing the Mach number for minimum turning losses.

A second wall 108 has an inner surface 110 further defining the exhaust stream flow path and an outer surface 112 defining, in part, the wing lower surface. Its downstream extremity includes a third flap 114 which provides nozzle throat area control. Flap 114 is hinged connected to the duct at 116 and is free to pivot thereabout under force of actuator 118 which is operatively connected to a clevis 120 of flap 114 at 122. Local fairings 124 are provided to house the flap actuators when their size precludes complete encapsulation within the normal wing profile.

In operation in an undeflected exhaust gas mode, the nozzle throat 106 is formed between flap 114 and the articulated deflector means 80 as previously noted. In the deflected modes, flap 114 is controlled to pivot counterclockwise to cooperate with flap 84, thereby repositioning the throat 106' therebetween. It can be readily seen that in the deflected mode the throat, the location of maximum exhaust velocity, is downstream of the turning, thereby minimizing turning losses due to high Mach number.

While the exhaust nozzle of FIG. 6 is depicted as incorporated in the exhaust system of FIG. 1, it is recognized that the principals underlying this nozzle are applicable to many applications, whether or not afterburning is employed. Further, it may be incorporated in a low aspect ratio embodiment (in a pod or nacelle) wherein flaps 84 and 114 comprise nacelle structure.

It should be obvious to one skilled in the art that certain changes can be made to the above-described invention without departing from the broad inventive concepts thereof. For example, the propulsion system may have the gas turbine engine incorporated entirely within the wing thereby eliminating the necessity for flow turning other than that required to transist to a higher aspect ratio cross section. Furthermore, more than one engine may communicate with a single exhaust nozzle. Conversely, a single engine might provide exhaust gases for multiple exhaust nozzles. It is intended that the appended claims cover these and all other variations in the present invention's broader inventive concepts.

Having thus described the invention, what is claimed as novel and desired to be secured by Letters Patent of the United States is:

1. A flight maneuverable exhaust device for a gas turbine engine including:
    a first wall partially defining an exhaust stream flow path;
    an articulated exhaust stream deflector means forming a portion of the first wall and comprising:
    first flap means of the variable position variety associated with an upstream fixed duct portion and adapted to provide internal flow path area variation;
    second flap means of the variable position variety to deflect and turn the exhaust stream exiting the exhaust device to selected angles relative to the engine axial direction in at least one operative mode; and
    means operatively connecting the first and second flap means to provide predetermined synchronous movement therebetween;
    a second wall substantially opposed to the first wall and further defining the exhaust stream flow path, the second wall including third flap means of the variable position variety operatively connected to the fixed duct portion and cooperating with the deflector means to form a variable position throat therebetween; and
    actuation means operatively connected to the second and third flap means to provide movement thereof.

2. The exhaust device of claim 1 wherein the operative connecting means includes cam means disposed upon the first flap means and a cooperating slot formed within the second flap means and receiving the cam means.

3. The exhaust device of claim 1 wherein the second flap means comprises an aircraft wing flap, one face of which partially defines the exhaust stream flow path and another face of which partially defines an upper wing surface.

4. The exhaust device of claim 3 wherein the third flap means comprises another aircraft wing flap, one face of which further partially defines the exhaust stream flow path and another face of which partially defines a lower wing surface.

5. The exhaust device of claim 4 wherein the third flap means is pivotably connected to the fixed duct portion upstream of the first flap means.

6. The exhaust device of claim 1 wherein the operative connecting means and the actuation means cooperate to rotate the first and second flap means in opposite directions.

7. The exhaust device of claim 1 wherein, when the second flap means is deployed in an exhaust gas deflecting position, the operative connecting means positions the first flap means so as to create a local flow path divergence upstream of the second flap means.

8. The exhaust device of claim 1 wherein the second flap means has an inverted U-shaped profile comprising an aircraft wing flap and two arms pivotably connected to the fixed duct portion.

9. The exhaust device of claim 1 wherein the throat is disposed downstream of the exhaust gas turning when the second flap means is in said operative deflecting mode.

10. A gas turbine engine propulsion system for installation in an aircraft comprising a thrust producing engine; an exhaust duct partially defining an exhaust stream flow path having a throat, and including in serial flow relationship a substantially cylindrical diffuser, a transition section, and a flattened duct section having a width exceeding its height; burner means within the flattened duct section for selectively reheating the exhaust stream; and a flight maneuverable exhaust device downstream of said burner means and comprising generally opposed walls further defining the exhaust stream flow path, deflector means associated with a first of said walls and including first and second variable position flap means, third variable position flap means associated with a second of said walls and generally opposed to said deflector means, and means for selectively positioning each of said flap means such that in one operating mode the second flap means deflects and turns the exhaust stream to vector the thrust at an angle to the engine axial direction, the first flap means locally expands the exhaust stream proximate the first wall ahead of the second flap, and the third flap means positions the throat downstream of the turning in cooperation with the first flap means.

11. The propulsion system of claim 10 wherein the axial centerline of the flattened section is laterally displaced from the core engine axis.

12. The propulsion system of claim 11 wherein the exhaust duct is substantially "S-shaped".

13. The propulsion system engine of claim 10 including flow turning means disposed within the exhaust duct.

14. The propulsion system of claim 10 wherein the gas turbine engine is disposed substantially within an aircraft fuselage.

15. The propulsion system of claim 10 wherein the gas turbine engine is disposed substantially within the aircraft wing.

16. The propulsion system of claim 10 wherein the flight maneuverable exhaust device is of substantially trapezoidal cross section.

17. A propulsion system for installation in an aircraft comprising:
a gas turbine engine for generating propulsion thrust;
an exhaust duct partially defining an exhaust stream flow path and comprising, in serial flow relationship, a substantially cylindrical diffuser section, a transition section and a flattened duct section having a width exceeding its height disposed within and in conformance with an aircraft structure;
burner means disposed within the flattened section to provide reheating of the exhaust stream in at least one operating mode; and
a flight maneuverable exhaust device, disposed in relatively close axial proximity to said burner means; wherein the burner means is of the duct burner variety and includes dividing means to segment the duct burner into a plurality of laterally adjacent compartments, each of said compartments comprising:
an inlet to receive a portion of the exhaust stream gases;
means to inject fuel;
pilot burner means to ignite the mixture of fuel and exhaust gases;
flameholders connected to said pilot burner means; and
combustion cooling liner means.

18. A propulsion system for installation in an aircraft comprising;
a gas turbine engine for generating propulsive thrust;
an exhaust duct partially defining an exhaust stream flow path and comprising, in serial flow relationship, a substantially cylindrical diffuser section, a transition section and a flattened duct section having a width exceeding its height disposed within and in conformance with an aircraft structure;
burner means disposed within the flattened section to provide reheating of the exhaust stream in at least one operating mode; and
a flight maneuverable exhaust device, disposed in relatively close axial proximity to said burner means and comprising:
a first wall further defining the exhaust stream flow path;
an articulated exhaust stream deflector means forming a portion of the first wall and comprising:
first flap means of the variable position variety pivotably connected to the exhaust duct and adapted to provide internal flow path area variation;
second flap means of the variable position variety to deflect the exhaust stream in at least one operative mode;
means operatively connecting the first and second flap means to provide predetermined synchronous movement therebetween;
a second wall substantially opposed to the first wall and further defining the exhaust stream flow path, the second wall including third flap means of the variable position variety operatively connected to the exhaust duct and cooperating with the second flap means to form a variable position throat therebetween; and
actuation means operatively connected to the second and third flap means to provide force for movement thereof.

19. A propulsion system for installation in an aircraft comprising:
a gas turbine engine for generating propulsive thrust;
an exhaust duct partially defining an exhaust stream flow path and comprising, in serial flow relationship, a substantially cylindrical diffuser section, a transition section and a flattened duct section having a width exceeding its height disposed within and in conformance with an aircraft structure;
burner means disposed within the flattened section to provide reheating of the exhaust stream in at least one operating mode; and
a flight maneuverable exhaust device, disposed in relatively close axial proximity to said burner means; wherein the burner means comprises:
pilot burner means extending laterally substantially across the flattened section;
a plurality of upstanding flameholder means operatively connected to the pilot burner means; and flamespreader means operatively connecting predetermined ones of said flameholder means.

20. The propulsion system of claim 19 wherein predetermined ones of the flameholders are leaned axially.

21. A flight maneuverable exhaust device for a gas turbine engine comprising:
generally opposed walls partially defining an exhaust stream flow path having a throat;
deflector means associated with a first of said walls including first and second variable position flap means;
third variable positon flap means associated with a second of said walls and generally opposed to said deflector means; and
means for selectively positioning each of said flap means such that in one operating mode, the second flap means deflects and turns the exhaust stream at an angle to the engine axial direction, the first flap means locally expands the exhaust stream proximate the first wall ahead of the second flap, and the third flap positions the throat downstream of the turning in cooperation with the first flap means.

* * * * *